United States Patent [19]

Rasmussen et al.

[11] Patent Number: 4,843,338

[45] Date of Patent: Jun. 27, 1989

[54] INK-SET PRINTHEAD-TO-PAPER REFERENCING SYSTEM

[75] Inventors: Steve O. Rasmussen; Larry A. Jackson; David W. Pinkernell, all of Vancouver, Wash.

[73] Assignee: Hewlett-Packard Company, Palo Alto, Calif.

[21] Appl. No.: 113,035

[22] Filed: Oct. 23, 1987

[51] Int. Cl.[4] .................... G01D 15/18; G01D 15/34; B41J 11/20

[52] U.S. Cl. .............................. 346/140 R; 346/136; 400/55; 400/56; 400/126

[58] Field of Search ...................... 346/136, 140 PD; 400/55, 56, 126

[56] References Cited

U.S. PATENT DOCUMENTS 4,623,898 11/1986 Yamamoto .................... 346/76 PH 4,644,371 2/1987 Matsuura et al. .............. 346/76 PH 4,728,963 2/1988 Rasmussen et al. ............ 346/134 X

*Primary Examiner*—George H. Miller, Jr.

*Attorney, Agent, or Firm*—S. A. Kassatly; Bloor Redding, Jr.

[57] ABSTRACT

Several problems of alignment associated with ink-jet printers are alleviated by four aspects. In the first, a reverse bow (B) in the paper (12) is created for printing on single sheets of paper. The reverse bow, which in the transverse axis of the paper, forces the paper flat against the platen (14) by using the paper's own stiffness.

In the second aspect, the paper and the carriage (30) are referenced to the same part (the carriage guide (10)). In this configuration, the paper is urged against the underside of the carriage guide off of drive rollers (18), through the reverse bow, and onto the platen, where it is printed. The carriage is referenced to the carriage guide through a slider bump by means of a carriage shaft and gravity.

The carraige guide comprises stiff thin sheet metal, which is closely-toleranced and has well-controlled dimensions. Thus, this part is good to reference to, rather than molded-in parts, which are not stiff enough at the required thickness. Straightness is also difficult to achieve at the required thickness with plastic parts.

In the third aspect, the platen is allowed to move substantially perpendicular to the plane of the paper to accommodate thicker print media.

In the fourth aspect, the platen is maintained a minimum fixed distance from the carriage guide by bumps (38) to ensure that the paper is not pinched between the carriage guide and the platen.

25 Claims, 2 Drawing Sheets

Fig. 3.
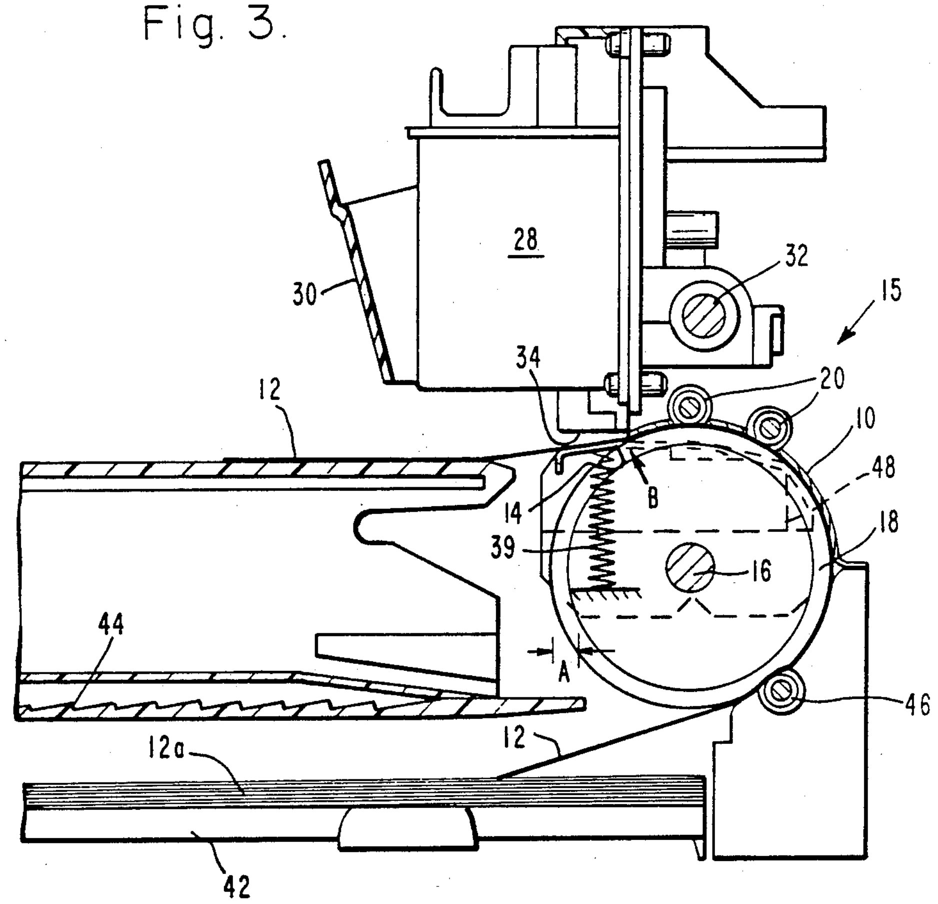
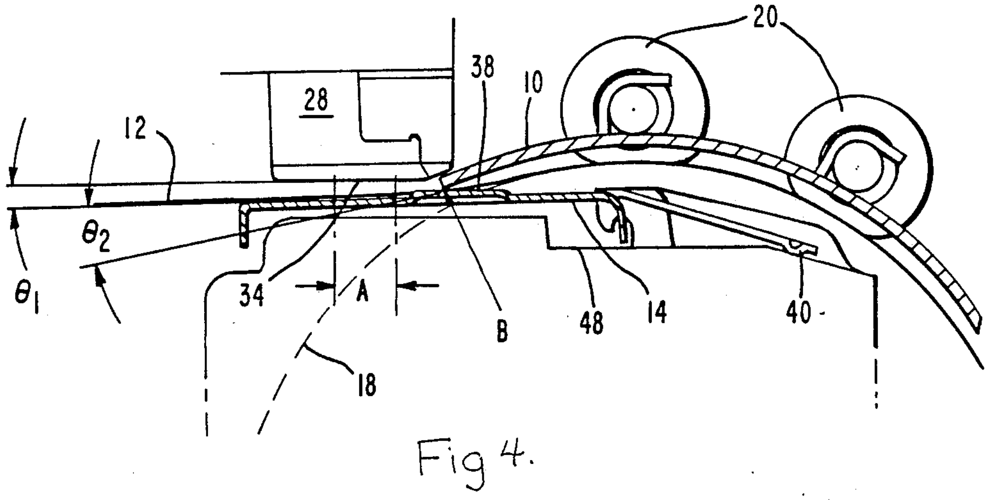
Fig 4.

INK-SET PRINTHEAD-TO-PAPER REFERENCING SYSTEM

TECHNICAL FIELD

The present invention relates to ink-jet printers, and, more particularly, to a referencing scheme for such printers.

BACKGROUND ART

Ink-jet printers comprise a plurality of interrelated components for printing on a print medium, such as paper. For example, the print zone of the paper is supported on a platen, and a print cartridge, secured in a bidirectionally movable carriage, prints characters on the paper in the print zone through a printhead in the cartridge.

There are several aspects of the printing that must be controlled to achieve consistency in printing from one sheet to the next and from one sheet thickness to another. For example, the printhead-to-paper space must be controlled, as must the printhead-to-paper angle.

The carriage moves on a shaft substantially parallel to the print zone, and the degree of parallelism must be controlled in order to assure uniformity of print across the sheet of paper. Further, the print medium is moved through the print zone by means of a drive roller mounted on a drive shaft. This drive shaft should also be maintained parallel to the print zone. Finally, the printer must be able to maintain the paper flat against the platen and deal with cockling of the paper, which occurs due to the presence of wet ink. Cockling tends to cause the gap between the paper and the printhead to vary.

The presence of wet ink on the medium requires special attention. Until the ink is dry, physical contact with the ink may result in smearing. However, physical contact with the print medium is usually required to remove the medium from the printer. This problem is usually addressed by adding a dryer or by reducing the print zone to allow for a contact area.

DISCLOSURE OF INVENTION

In accordance with the invention, the foregoing problems are alleviated by four considerations. In the first, a reverse bow in the paper is created for printing on single sheets of paper. The reverse bow, which is in the transverse axis of the paper (parallel to the direction of printing), forces the paper flat against the platen by using the paper's own stiffness. Since the platen and the direction of printhead travel are substantially parallel and the paper is held flat against the platen by the reverse bow, constant printhead-to-paper spacing is maintained. By angling the printhead slightly with respect to the plane of the print zone, the cockling of the paper does not touch the printhead and smear the wet ink.

In the second aspect of the invention, the paper and the carriage are both referenced on the same part (a carriage guide). In this configuration, the paper is urged against the underside of the carriage guide off of drive rollers, through the reverse bow in the print zone, and onto the platen, where it is printed. The carriage is referenced to the carriage guide through a slider bump by means of a carriage shaft and gravity.

The carriage guide comprises stiff thin sheet metal (e.g., 0.032 inch), which is closely-toleranced and has well-controlled dimensions. Thus, this part is good to reference to, rather than molded-in parts, which are not stiff enough at the required thickness. Straightness is also difficult to achieve at the required thickness with plastic parts.

In the third aspect of the invention, the platen is allowed to move approximately perpendicular to the plane of the paper by means of spring loading to accommodate thicker print media.

In the fourth aspect of the invention, the platen is maintained a minimum fixed distance from the carriage guide to ensure that the paper is not pinched between the carriage guide and the platen. This reduces drag forces such that skew is minimized and paper drive forces are reduced. The lower drag forces eliminate the need for a reduced print zone, which is to provide a contact area for moving the paper, as the paper can be pushed into the print zone.

BRIEF DESCRIPTION OF THE DRAWINGS

FIG. 3 is a side elevational view, showing passage of the sheet of print medium between the carriage guide and the platen and association of the print cartridge therewith; and FIG. 4 is a cross-sectional view of a portion of the carriage guide shown in FIG. 3, showing the relationship of the various referencing parts to each other.

BEST MODES FOR CARRYING OUT THE INVENTION

Figure 1:
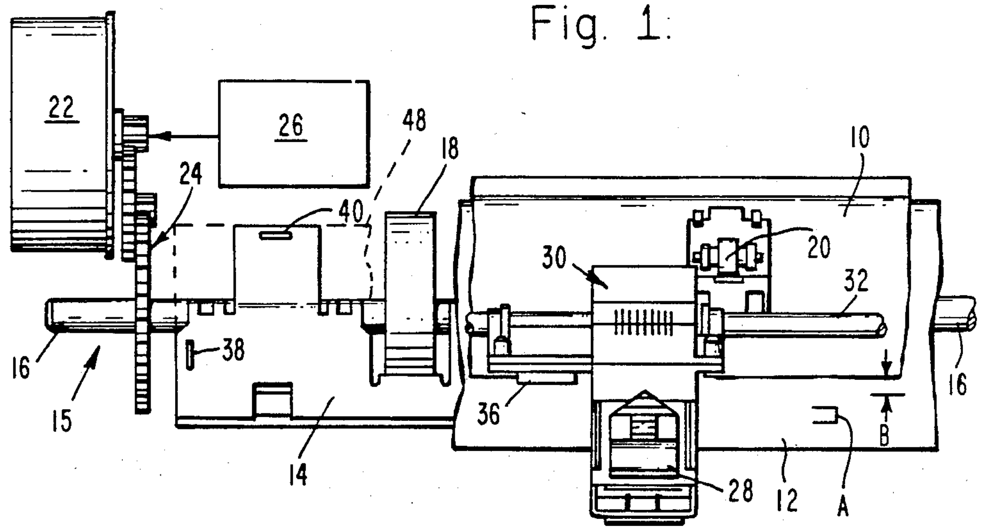
FIG. 1 is a top plan view, showing a portion of a carriage guide, a platen and a sheet of print medium therebetween, with a print cartridge associated therewith.

Referring now to the drawings wherein like numerals of reference designate like elements throughout, a portion of an ink-jet printer is shown in FIG. 1. The pertinent components depicted include a carriage guide 10, which guides a sheet 12 of a print medium over a platen 14. The sheet 12 is moved into the print zone, designated "A", by a medium-moving means 15.

In a preferred embodiment, the medium-moving means includes a drive shaft 16 and a plurality of drive rollers 18 (one of which is visible in FIG. 1) secured on the drive shaft 16. The drive rollers contact the sheet 12 and move it through the print zone. Pinch rollers 20 (one of which is visible in FIG. 1) are secured to the top of the carriage guide 10 and extend therethrough. The pinch rollers 20, in combination with the drive rollers 18, urge the print medium 12 against the platen 14. The drive shaft 16 is rotated by a motor 22 by suitable gearing 24 thereto; the motor is controlled by a microprocessor 26.

A print cartridge 28 is secured in a carriage 30, which is guided on a carriage guide shaft 32 and moved bidirectionally by a toothed belt (not shown) under the control of the microprocessor 26. The print cartridge 28 includes a reservoir of ink (not shown), which is fed to a printhead 34 (seen in FIG. 2). The printhead 34 is provided with orifices (not shown) for ejecting droplets of ink onto the sheet 12 in desired characters.

Figure 2:
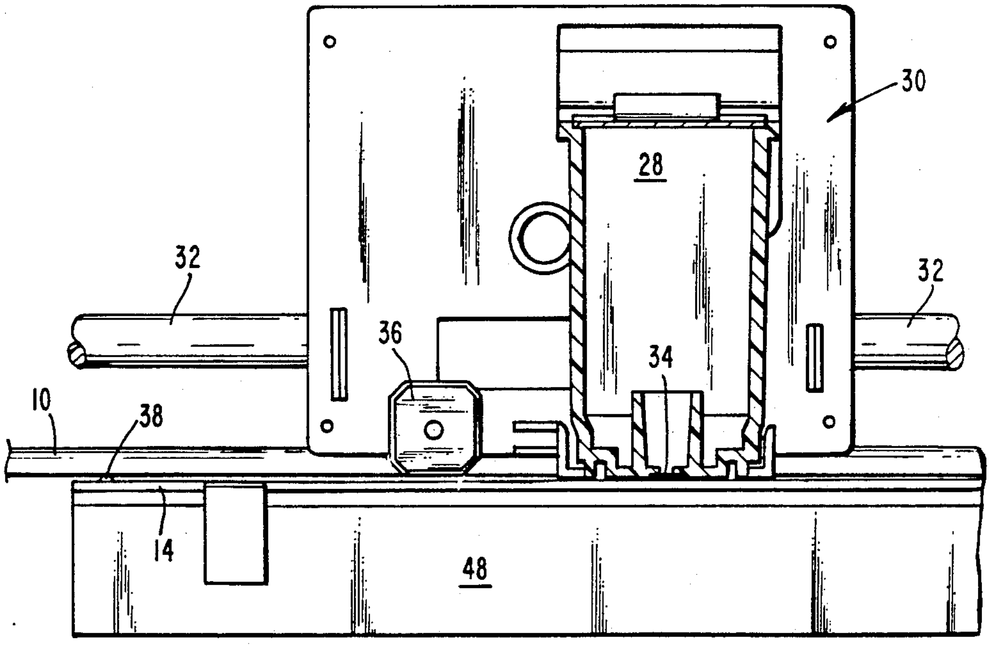
FIG. 2 is a front elevational view, partly in cross-section, showing the relationship of referencing the printhead to the paper.

As seen in FIG. 2, the carriage 30 includes a slider bump 36, which rides on the surface of the carriage guide 10. The weight of the carriage 30 preloads the slider bump 36 against the carriage guide 10, thereby making constant contact. The slider bump 36 comprises a low friction, long wearing material and may be a separate piece or a molded-in feature of the carriage 30. The slider bump 36 could also be a molded-in feature on the print cartridge 28, which is a disposable part. The slider bump 36 serves to maintain the printhead 34 a constant, fixed distance from the print medium 12. The fixed distance may range from about 0.030 to 0.050 inch for a balance of optimum printing and minimum smearing resulting from cockling.

The platen 14 references to the bottom side of the front edge of the carriage guide 10 by platen bumps 38. The platen bumps 38 are provided on either side of the paper (see also FIG. 1), beyond the dimension of the widest paper to be accommodated in the printer, so as to avoid interference therewith. Platen springs 39 preload the platen bumps 38 against the carriage guide 10 (see FIG. 3). The platen bumps 38 provide a constant spacing between the platen 14 and the carriage guide 10. Spring loading serves to remove sensitivity to the tolerances from the platen 14 through the platen support 48, drive shaft 16, chassis (not shown), to the carriage guide 10.

The platen 14 is spring-loaded (by means of springs 39) to accommodate thick print media, such as envelopes. The platen bumps 38 are set to a height to allow thin media, such as paper, to slide through the resulting gap (thereby eliminating the drag force), and require thicker media, such as envelopes, to push the platen 14 down against the springs 39.

The height of the platen bumps 38 is chosen such that the gap between the platen 14 and the carriage guide 10 is between about 0.006 to 0.015 inch. Since the thicker media force the platen 14 down, the extra thickness is accommodated on the side opposite from the printed side, and the printed surface remains at a relatively fixed distance from the printhead. Thick media force the platen 14 down, which increases the drag force. However, the thicker media also increase the compression of the pinch rollers 20 and 46, which increases the driving force and more than compensates for the increased drag force.

The platen angle is maintained by using reference bumps 40 which reference to a platen support 48 associated with the platen 14. The reference bumps 40 are positioned sufficiently far away from the front edge of the carriage guide 10 to achieve a printhead-to-paper angle (Angle $\theta_1$ in FIG. 4) of about 1° to 6° as discussed below.

In one embodiment, the platen support 48 is capable of pivoting about the axis of the drive shaft 16, and controls downward pivoting of the platen 14 in connection with paper-handling activities that are not part of the present invention, but is disclosed in greater detail in co-pending patent application Ser. No. 024,278, filed on Mar. 11, 1987 now issued under U.S. Pat. No. 4,728,963, and is incorporated herein by reference. The downward pivoting is accomplished by contact of the platen support 48 to an offset pin (not shown) on a pivot gear (not shown). The pivot gear is coupled to a mechanical multiplexer (not shown) by means of a gear train (not shown) to cause the downward pivot of the platen 14.

The print cartridge 28 is referenced to the carriage 30, as discussed in greater detail in copending patent application Ser. No. 113,101 filed on even date herewith. Essentially, features are provided on the print cartridge 28 which align with corresponding features in the carriage 30 to ensure that the cartridge is locked-in identically the same position in the carriage each time.

The carriage 30 mounts on the shaft 32 and is referenced to the carriage guide 10 through the slider bump 36 on the carriage, discussed above.

In order to maintain sufficiently consistent spacing and angle, the shaft 32 and front edge of the carriage guide 10 must be parallel. These two parts must also maintain proper relative orientation.

To accomplish this, one side (here, the left side) of each part (shaft 32 and carriage guide 10) is referenced to molded-in features (not shown) on the printer chassis and the right side on the right wall. As used herein, the printer chassis and right wall constitute the frame of the printer.

Keeping the end of each part referenced to the same part provides parallelism and orientation due to solid mounts between the shaft 32 and carriage guide 10.

FIG. 3 shows one configuration in which the sheet 12 of paper is fed around the drive shaft 16 by the rollers 18, beneath the carriage guide 10 and onto the platen 14. The transition from the guide 10 to the platen 14 results in a reverse bow of the paper 12 at point B (just behind the print zone A). This reverse bow at B causes the paper 12 to lie flat along the platen 14 in the region that the printhead 34 passes over, thereby maintaining a constant and closely controlled gap between the printhead and the paper, which is required for ink-jet technology. The reverse bow is a change in direction of the paper when the paper comes off the drive roller 18 and slides along the platen 14. The carriage guide 10 forces the paper into a bow rather than a straight line from the drive roller 18 to the platen 14 (as seen in FIG. 4). This change in direction is caused by positioning the drive roller 18, platen 14, and carriage guide 10 such that the angle of the paper as it leaves the drive roller 18 is different than the angle of the platen 14. The front edge of the carriage guide 10 is positioned such that it forces the paper into a bow. This change in angle (Angle $\theta_2$ in FIG. 4) should be between about 5° and 45°.

In the embodiment depicted in FIG. 3, a sheet 12 of paper is picked by a plurality of drive rollers 18 from a stack of paper **12*a* in an input tray 42, and rotated around the drive rollers through the print zone A onto an output tray 44. Pinch rollers 20, 46 maintain the paper 12 against the drive rollers 18**.

In FIG. 4, the printhead-to-paper angle is depicted. As can be seen, the paper 12 travels at an angle $\theta_1$ to the printhead 34. For optimum results, the paper makes a positive angle of from about 1° to 6°. This positive angle is sufficient to prevent smearing of wet ink by any portion of the printhead 34 as a consequence of cockling of the paper. Paper cockling is due to paper expansion from the absorption of the wet ink, and causes the paper 12 to lift and move toward the printhead 34. Angling the paper 12 downward from the printhead 34 provides clearance for the cockling effect.

The angle ($\theta_1$) of the paper with respect to the printhead 34 is achieved by angling the paper downward and the printhead 34 upward. The angle of the paper is controlled by maintaining the angle of the platen 14, as described above. The angle of the printhead is controlled by the height of the slider bump 36. A taller slider bump 36 will rotate the carriage clockwise as seen in FIG. 3, thereby increasing the printhead angle.

Providing the reverse bow (at B), referencing the print medium 12 and the carriage 30 to the same part (the carriage guide 10), and providing spring-loading to the platen and bumps 38 to maintain a minimum fixed spacing from the carriage guide, permits achieving substantially consistent printhead-to-paper spacing from one sheet of print medium to the next, regardless of media thickness or part tolerances.

These techniques also permit printing at the top of the page, the use of lower paper drive forces, and paper handling, without contacting the printed surface or reducing the print zone to provide such a contact area.

INDUSTRIAL APPLICABILITY

The various printhead-paper referencing techniques discussed above are expected to find use in improved ink-jet printers.

Thus, printhead-to-paper referencing schemes are disclosed which, by setting the printhead-to-paper spacing and angle, by establishing the shaft and carriage guide parallelism, and by creating the reverse bow, provide improved printing by an ink-jet printer. It will be apparent to one of ordinary skill in the art that various changes and modifications of an obvious nature may be made, and all such changes and modifications are intended to fall within the scope of the invention, as defined by the appended claims.

What is claimed is:

1. An improved ink-jet printer including a print cartridge (28) having a printhead (34) thereon and secured in a carriage (30), said printer further including a carriage guide (10), a platen (14, for supporting a print medium (12) at least through a print zone (A), and means (15) for moving said print medium beneath said carriage guide and ont said platen, the improvement comprising:

(a) said carriage guide including means for creating a reverse bow (B) in said print medium, parallel to the direction of printing, which causes said print medium to lie substantially flat on said platen;

(b) said means for moving (15) and said carriage (30) having means (36,18) for referencing said carriage and said print medium to said carriage guide; and (c) said platen including means (39) for permitting said platen to move to accommodate varying thicknesses of said print medium.

2. The printer of claim 1 wherein said reverse bow is provided at the point said print medium emerges from said carriage guide onto said platen.

3. The printer of claim 2 wherein said reverse bow is created by establishing an angle ($\theta_1$) between said print medium as it emerges from said carriage guide and said platen ranging from about 5° to 45°.

4. The printer of claim 1 wherein said print medium is referenced to said carriage guide by means (18, 20) which urge said print medium to the underside of said carriage guide and through said print zone on said platen.

5. The printer of claim 1 wherein said accommodating means comprise spring-loading means, which permit said platen to move away from said carriage guide.

6. The printer of claim 1 further including means (38) for maintaining said platen a minimum, fixed distance from said carriage guide.

7. The printer of claim 6 wherein said distance ranges from about 0.006 to 0.015 inch.

8. The printer of claim 1 further including means (40) for angling said platen to achieve a printhead-to-paper angle of about 1° to 6°.

9. An improved ink-jet printer including a print cartridge (28) having a printhead (34) thereon and secured in a carriage (30), said printer further including a carriage guide (10), a platen (14), for supporting a print medium (12) at least through a print zone (A), and means (15) for moving said print medium beneath said carriage guide and onto said platen, the improvement comprising:

(a) said carriage guide including means for creating a reverse bow (B) in said print medium, parallel to the direction of printing, which causes said print medium to lie substantially flat on said platen;

(b) said means for moving (15) and said carriage (30) having means (36,18) for referencing said carriage and said print medium to said carriage guide;

(c) said platen including means (39) for permitting said platen to move to accommodate varying thicknesses of said print medium; and (d) wherein said carriage is referenced to said carriage guide by means of a slider bump (36) on said carriage.

10. An improved ink-jet printer including a print cartridge (28) having a printhead (34) thereon and secured in a carriage (30), said printer further including a carriage guide (10), a platen (14), for supporting a print medium (12) at least through a print zone (A), and means (15) for moving said print medium beneath said carriage guide and onto said platen, the improvement comprising:

(a) said carriage guide including means for creating a reverse bow (B) in said print medium, parallel to the direction of printing, which causes said print medium to lie substantially flat on said platen;

(b) said means for moving (15) and said carriage (30) having means (36,18) for referencing said carriage and said print medium to said carriage guide;

(c) said platen including means (39) for permitting said platen to move to accommodate varying thicknesses of said print medium; and (d) wherein said angling means comprises reference bumps positioned on said platen, which contact an underlying platen support (48).

11. A printer including a carriage (30), and a cartridge (28) secured to the carriage and having a printhead (34), the printer being adapted for printing on a print medium and comprising:

(a) carriage guide means (10) for supporting the carriage;

(b) platen means (14), disposed partially underneath said carriage guide means and partially underneath said carriage, for supporting the print medium at least through a predetermined print zone (A), in a plane substantially parallel to the direction of printing;

(c) medium moving means (15) for causing the print medium to move into the print zone;

(d) first means for referencing the print medium to said platen means;

(e) second means, secured to the cartridge, for referencing (36) the printhead to said carriage guide means;

(f) third means, secured to said platen means, for referencing (38,40) said platen means to said carriage guide means; and (g) wherein said first referencing means includes means for creating a reverse bow (B) in the print medium, and for causing the print medium to be directed atop said platen means in a plane substantially parallel to the direction of printing.

12. The printer as defined in claim 11, wherein said reverse bow is provided in the area generally adjacent to the print zone.

13. The printer as defined in claim 12, wherein said reverse bow forces the print medium to lie substantially flat against said platen means.

14. The printer as defined in claim 11, wherein said second referencing means includes a slider bump (36), which projects generally downwardly from the carriage and which abuts said carriage guide means, for maintaining the printhead at a predetermined distance from the print medium.

15. The printer as defined in claim 14, wherein the carriage preloads said slider bump under the force of gravity, for causing it to make constant contact with said carriage guide.

16. The printer as defined in claim 15, wherein said slider bump has a low-friction thermoplastic composition.

17. The printer as defined in claim 14, wherein said predetermined distance between the printhead and the print medium ranges from about 0.030 inch to about 0.050 inch, for providing optimum printing quality, and for reducing substantially the smearing effect which results from the cockling of the print medium.

18. The printer as defined in claim 11, wherein said platen means includes a substantially flat platen surface which is generally parallel to the direction of printing;

wherein said third means for referencing includes at least two bumps (38), which are generally oppositely, symmetrically, dorsally located on said platen; and wherein said bumps have similar heights, and are retained resiliently against said carriage guide means, for maintaining a predetermined spacing between said platen and said carriage guide.

19. The printer as defined in claim 18, wherein at least two of said bumps are provided on either side of said platen.

20. The printer as defined in claim 18, wherein said platen means further includes spring means (39) for preloading said bumps against said carriage guide means.

21. The printer as defined in claim 20, wherein said spring means further enable the printer to accommodate print media of varying thicknesses.

22. The printer as defined in claim 21, wherein said spacing between said platen and said carriage guide ranges from about 0.006 inc to about 0.015 inch.

23. The printer as defined in claim 18, wherein said printhead includes a substantially flat printhead surface, and wherein said platen surface is generally angularly disposed relative to said printhead surface.

24. The printer as defined in claim 23, wherein the angle defined by said printhead surface and said platen surface is sufficient to prevent smearing of wet ink on the print medium.

25. The printer as defined in claim 24, wherein said angle ranges between 1 degree and 6 degrees.

* * * * *